(12) United States Patent
Kurosawa et al.

(10) Patent No.: US 11,498,552 B2
(45) Date of Patent: Nov. 15, 2022

(54) PARKING ASSISTANCE DEVICE AND CONTROL METHOD OF PARKING ASSISTANCE DEVICE

(71) Applicant: CLARION CO., LTD., Saitama (JP)

(72) Inventors: Daiki Kurosawa, Saitama (JP); Junya Murayama, Saitama (JP)

(73) Assignee: CLARION CO., LTD., Saitama (JP)

( * ) Notice: Subject to any disclaimer, the term of this patent is extended or adjusted under 35 U.S.C. 154(b) by 379 days.

(21) Appl. No.: 16/832,826

(22) Filed: Mar. 27, 2020

(65) Prior Publication Data

US 2020/0331462 A1 Oct. 22, 2020

(30) Foreign Application Priority Data

Apr. 22, 2019 (JP) .............................. JP2019-081135

(51) Int. Cl.
*B60W 30/06* (2006.01)
*B60W 30/095* (2012.01)
*B60W 60/00* (2020.01)
*G08G 1/14* (2006.01)
*G06V 20/58* (2022.01)

(52) U.S. Cl.
CPC ........ *B60W 30/06* (2013.01); *B60W 30/0956* (2013.01); *B60W 60/0011* (2020.02); *G06V 20/58* (2022.01); *G08G 1/14* (2013.01)

(58) Field of Classification Search
CPC ............. B60W 30/06; B60W 60/0011; B60W 30/0956; G06V 20/58; G08G 1/14
See application file for complete search history.

(56) References Cited

U.S. PATENT DOCUMENTS

| 2006/0069478 | A1 | 3/2006 | Iwama |
| 2013/0088578 | A1* | 4/2013 | Umezawa ............... G08G 1/166 348/47 |
| 2013/0293683 | A1* | 11/2013 | Zhou .................. H04N 5/23238 348/148 |
| 2014/0114529 | A1 | 4/2014 | An et al. |
| 2015/0232089 | A1 | 8/2015 | Niino et al. |

(Continued)

FOREIGN PATENT DOCUMENTS

| EP | 1642808 A1 | 4/2006 |
| JP | 2015-154337 A | 8/2015 |

OTHER PUBLICATIONS

French Search Report mailed by French Patent Office dated Aug. 2, 2021 in corresponding French patent application No. FR2003890.

*Primary Examiner* — Hussein Elchanti
(74) *Attorney, Agent, or Firm* — IP Business Solutions, LLC

(57) ABSTRACT

A parking assistance ECU is a device that assists parking of a subject vehicle and includes a route generation unit that generates a travel route on which the subject vehicle travels, a selection unit that selects, based on the travel route, a camera used for detection of an obstacle among a front camera, a right side camera, a left side camera, and a rear camera which capture an image of a surrounding of the subject vehicle, in a case where a turning action of the subject vehicle is included in the travel route, and an obstacle detection unit that detects an obstacle which possibly contacts with the subject vehicle from a captured image captured by the camera selected by the selection unit.

7 Claims, 10 Drawing Sheets

(56) References Cited

U.S. PATENT DOCUMENTS

| | | | | |
|---|---|---|---|---|
| 2018/0154831 A1* | 6/2018 | Spencer | ............. | H04N 5/23238 |
| 2018/0339700 A1* | 11/2018 | Lee | ...................... | G06V 20/588 |
| 2018/0362026 A1* | 12/2018 | Heimberger | .... | B60W 30/18036 |
| 2019/0392229 A1* | 12/2019 | Yamamoto | ........... | G06V 20/586 |

\* cited by examiner

PARKING ASSISTANCE DEVICE AND CONTROL METHOD OF PARKING ASSISTANCE DEVICE

INCORPORATION BY REFERENCE

The present application claims priority under 35 U.S.C. § 119 to Japanese Patent Application No. 2019-081135 filed on Apr. 22, 2019. The content of the applications is incorporated herein by reference in its entirety.

BACKGROUND OF THE INVENTION

Field of the Invention

The present invention relates to a parking assistance device and a control method of a parking assistance device.

Description of the Related Art

In related art, a device has been known which assists a driving operation by a driver. For example, Japanese Patent Laid-Open No. 2015-154337 discloses a technique in which a turning amount that represents a turning degree of a subject vehicle is acquired, an image-capturing range of an image-capturing device is moved to an outside of a turning direction based on the acquired turning amount, and a region which the driver is apt to overlook is supplemented by a captured image by the image-capturing device.

SUMMARY OF THE INVENTION

However, in a case where plural image-capturing units are mounted on a vehicle and captured images that are captured by the plural image-capturing units are analyzed, a processing load of a device may increase.

One aspect of the present invention has been made in consideration of the above circumstance, and an object is to inhibit an increase in a processing load while maintaining safety of a vehicle.

To achieve the above object, a parking assistance device of one aspect of the present invention is a parking assistance device that assists parking of a vehicle and includes: a route generation unit that generates a travel route on which the vehicle travels; a selection unit that selects, based on the travel route, an image-capturing unit used for detection of an obstacle among plural image-capturing units which capture an image of a surrounding of the vehicle, in a case where a turning action of the vehicle is included in the travel route; and an obstacle detection unit that detects an obstacle which possibly contacts with the vehicle from a captured image captured by the image-capturing unit selected by the selection unit.

In the above parking assistance device, the selection unit may set reference points at preset intervals on the travel route, use an attitude angle of the vehicle in a start position of the travel route as a reference, calculate a change amount in the attitude angle in each of the reference points, and determine that a turning action is included in the travel route in a case where the reference point is present in which the calculated change amount in the attitude angle is greater than a threshold value.

In the above parking assistance device, the obstacle detection unit may detect an obstacle that possibly collides with the vehicle from a captured image captured by the image-capturing unit selected by the selection unit, before a start of the turning action, in a case where the vehicle is in a stop state.

In the above parking assistance device, the selection unit may select a front area image-capturing unit that captures an image of a front area of the vehicle and a left area image-capturing unit that captures an image of a left area of the vehicle among the plural image-capturing units in a case where the vehicle performs forward travel and where the turning action is a left turn.

In the above parking assistance device, the selection unit may select a front area image-capturing unit that captures an image of a front area of the vehicle and a right area image-capturing unit that captures an image of a right area of the vehicle among the plural image-capturing units in a case where the vehicle performs forward travel and where the turning action is a right turn.

In the above parking assistance device, the selection unit may select a rear area image-capturing unit that captures an image of a rear area of the vehicle and a right area image-capturing unit that captures an image of a right area of the vehicle among the plural image-capturing units in a case where the vehicle performs backward travel and where the turning action is a left turn.

In the above parking assistance device, the selection unit may select a rear area image-capturing unit that captures an image of a rear area of the vehicle and a left area image-capturing unit that captures an image of a left area of the vehicle among the plural image-capturing units in a case where the vehicle performs backward travel and where the turning action is a right turn.

A control method of a parking assistance device of one aspect of the present invention is a control method of a parking assistance device that assists parking of a vehicle, the control method including: a step of generating a travel route on which the vehicle travels; a step of selecting an image-capturing unit used for detection of an obstacle among plural image-capturing units mounted on the vehicle based on the travel route in a case where a turning action of the vehicle is included in the travel route; and a step of detecting an obstacle that possibly contacts with the vehicle from a captured image captured by the image-capturing unit selected by the step of selecting.

In one aspect of the present invention, an increase in a processing load may be inhibited while safety of a vehicle is maintained.

DETAILED DESCRIPTION OF THE PREFERRED EMBODIMENT

An embodiment of the present invention will hereinafter be described with reference to the attached drawings.

Figure 1:
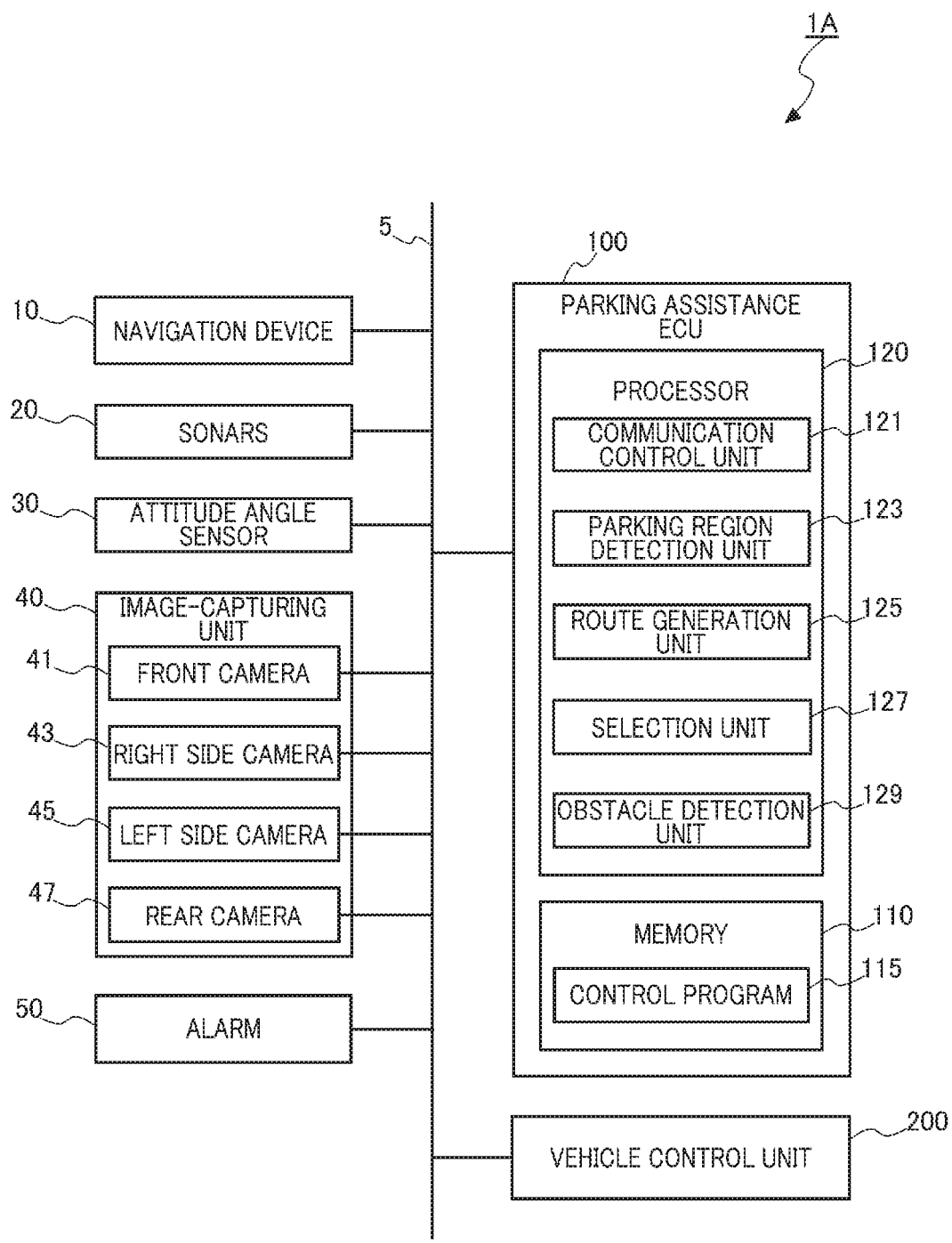
FIG. 1 is a block diagram that illustrates a configuration of a subject vehicle.

FIG. 1 is a block diagram that illustrates a configuration of a vehicle (hereinafter referred to as subject vehicle 1A) on which a parking assistance electronic control unit (ECU) 100 corresponding to "parking assistance device" is mounted. The parking assistance ECU 100 is a control device that assists parking of the subject vehicle 1A at a parking region. The parking assistance ECU 100 detects a parking region for parking the subject vehicle 1A based on a captured image by a camera and a detection result of a sensor such as a sonar and generates a travel route to the detected parking region.

The subject vehicle 1A is a vehicle that travels by a driving operation by a driver and is a vehicle that is capable of being driven by autonomous driving by computer control without the driving operation by the driver. The subject vehicle 1A is a vehicle such as a four-wheeled vehicle driven by an engine, an electrically driven vehicle driven by a motor, or a hybrid vehicle on which a motor and an engine are mounted, for example. The subject vehicle 1A may be a vehicle other than a four-wheeled vehicle.

The parking assistance ECU 100 is connected with a CAN bus 5. In addition to the parking assistance ECU 100, a navigation device 10, sonars 20, an attitude angle sensor 30, an image-capturing unit 40, an alarm 50, and a vehicle control unit 200 are connected with the CAN bus 5. Those devices are connected with the CAN bus 5 as nodes, and an in-vehicle network of the subject vehicle 1A is constructed.

The navigation device 10 includes a GPS antenna and a GPS reception unit and receives a GPS signal transmitted from a GPS satellite. The navigation device 10 measures distances between the subject vehicle 1A and GPS satellites and change ratios of the distances with respect to a prescribed number or more of satellites based on received GPS signals and thereby calculates an absolute position (latitude and longitude) of the subject vehicle 1A. The navigation device 10 outputs position information that indicates the calculated absolute position of the subject vehicle 1A to the parking assistance ECU 100. The navigation device 10 calculates a heading that indicates an advancing direction of the subject vehicle 1A and outputs heading information that indicates the heading of the subject vehicle 1A to the parking assistance ECU 100.

The sonar 20 is configured with an ultrasonic sonar, for example. Plural sonars 20 are mounted on the subject vehicle 1A. Those plural sonars 20 transmit ultrasonic waves toward surroundings of the subject vehicle 1A, reflected waves that are reflected by an obstacle are received, presence of the obstacle is thereby detected, and the distance to the detected obstacle is measured. The sonar 20 outputs the detected obstacle and the distance to the obstacle to the parking assistance ECU 100.

The attitude angle sensor 30 is a sensor that detects a pitch angle, a yaw angle, and a roll angle of the subject vehicle 1A and thereby detects the attitude angle of the subject vehicle 1A. The attitude angle is a rotational angle of the vehicle that changes in accordance with a yawing motion of the subject vehicle 1A. The attitude angle sensor 30 outputs the detected attitude angle to the parking assistance ECU 100.

The image-capturing unit 40 includes a front camera 41, a right side camera 43, a left side camera 45, and a rear camera 47. The front camera 41, the right side camera 43, the left side camera 45, and the rear camera 47 generate captured images by performing image-capturing at prescribed intervals and output the generated captured images to the parking assistance ECU 100. The front camera 41, the right side camera 43, the left side camera 45, and the rear camera 47 correspond to "image-capturing unit" of the present invention. The front camera 41 corresponds to "front area image-capturing unit" of the present invention, and the rear camera 47 corresponds to "rear area image-capturing unit" of the present invention. The right side camera 43 corresponds to "right area image-capturing unit" of the present invention, and the left side camera 45 corresponds to "left area image-capturing unit" of the present invention.

Each of the front camera 41, the right side camera 43, the left side camera 45, and the rear camera 47 includes an image sensor such as charge-coupled device (CCD) or a complementary metal-oxide-semiconductor (CMOS) and captures an image of surroundings of the subject vehicle 1A, which include a road surface, at a prescribed frame rate. Angles of view of the front camera 41, the right side camera 43, the left side camera 45, and the rear camera 47 are adjusted such that those four cameras are capable of capturing images in a range of 360 degrees around the subject vehicle 1A as a center.

The front camera 41 is attached to a tip end portion of a front grill or the like, a back surface of a rear view mirror in a vehicle interior, or the like, for example, and captures an image of a front area, which includes a road surface, of the subject vehicle 1A. The front area of the subject vehicle 1A represents a direction toward a wind shield as seen from the driver seated on a driver seat.

The right side camera 43 is attached to a right side-view mirror, for example, and captures an image of a right section, which includes a road surface, of the subject vehicle 1A. The left side camera 45 is attached to a left side-view mirror, for example, and captures an image of a left section, which includes a road surface, of the subject vehicle 1A.

The rear camera 47 is attached to an opening lever of a rear gate, a rear spoiler, or the like, for example, and captures an image of a rear area, which includes a road surface, of the subject vehicle 1A. The rear area of the subject vehicle 1A represents a direction opposite to the front area of the subject vehicle 1A and toward a rear window as seen from the driver seated on the driver seat.

The number of cameras included in the image-capturing unit 40 and arrangement are examples and may arbitrarily be changed. That is, the number of cameras provided to the subject vehicle 1A may be more or less as long as it is possible to capture images of a range of 360 degrees around the subject vehicle 1A as the center.

The alarm 50 is a device that emits a sound to the surroundings of the subject vehicle 1A and gives warning. The alarm 50 is a speaker or a horn included in the subject vehicle 1A, for example. The alarm 50 may be a device that emits light such as a warning lamp or a light included in the subject vehicle 1A.

The vehicle control unit 200 generates control information that controls travel of the subject vehicle 1A based on a travel route calculated by the parking assistance ECU 100. The vehicle control unit 200 includes for example, CPU, ROM and RAM, and executes a control program stored in ROM or the like to control an engine, steering, a transmission, and so forth based on the generated control information and information from sensors or the like.

The parking assistance ECU 100 is a computer device that includes a memory 110 and a processor 120.

The memory 110 includes a volatile memory such as a random access memory (RAM) and a non-volatile memory such as a flash memory. The memory 110 stores a control program 115. The control program 115 is a program that is executed by the processor 120. The memory 110 temporarily stores captured images that are generated by the front camera 41, the right side camera 43, the left side camera 45, and the rear camera 47 of the image-capturing unit 40.

The processor 120 is an arithmetic processing device that is configured with a central processing unit (CPU) or a microcontroller. The processor 120 executes the control program 115 and controls each unit of the parking assistance ECU 100. The processor 120 may be configured with a single processor or may be configured with plural processors. The processor 120 may be configured with a system on chip (SoC) that is integrated with a portion or whole of the memory 110 or another circuit. The processor 120 may be configured with a combination of a CPU that executes a program and a digital signal processor (DSP) that executes prescribed arithmetic processing. In addition, the processor 120 may be configured such that all functions of the processor 120 are implemented in hardware or may be configured by using a programmable device.

The parking assistance ECU 100 includes a communication control unit 121, a parking region detection unit 123, a route generation unit 125, a selection unit 127, and an obstacle detection unit 129 as function blocks. Those function blocks denote functions, which are realized by executing command sets described in the control program 115 and performing computation of data and control by the processor 120, by blocks for convenience and do not denote specific application software or hardware.

The communication control unit 121 controls data communication with the vehicle control unit 200. The parking assistance ECU 100 is connected with the vehicle control unit 200 via the CAN bus 5. The communication control unit 121 receives vehicle information such as a vehicle velocity from the vehicle control unit 200 and transmits information that indicates the travel route for parking the subject vehicle 1A at a destination parking position to the vehicle control unit 200, for example.

To the parking region detection unit 123, captured images that are captured by the front camera 41, the right side camera 43, the left side camera 45, and the rear camera 47 and detection results by the sonars 20 are input. The parking region detection unit 123 detects obstacles such as another vehicle, a pole, a person, and a shopping cart or frame lines such as parking section lines based on the captured images and detection results by the sonars 20, which are input. The parking region detection unit 123 detects a parking region as a region at which the subject vehicle 1A is capable of being parked based on the detected obstacles, frame lines, section lines, and so forth.

The route generation unit 125 generates a travel route in a parking lot, on which the subject vehicle 1A travels. The travel route generated by the route generation unit 125 may be a route from a present position of the subject vehicle 1A to a parking region detected by the parking region detection unit 123. In a case where a stop position at which travel of the subject vehicle 1A is temporarily stopped is included in the travel route from the present position to the parking region, the route generation unit 125 may generate a travel route to the stop position and generate a travel route from the stop position to the parking region after the subject vehicle 1A reaches the stop position. The stop position includes a backward movement start position in which switching is made from forward travel to backward travel, a turnabout position in which the advancing direction of the subject vehicle 1A is turned, and so forth.

The selection unit 127 selects a captured image used for detection of an obstacle. The selection unit 127 selects a captured image used for detection of an obstacle from captured images by the front camera 41, the right side camera 43, the left side camera 45, and the rear camera 47.

The selection unit 127 detects an obstacle by analyzing a captured image by the front camera 41 in a case where the subject vehicle 1A performs forward travel. The selection unit 127 detects an obstacle by analyzing a captured image by the rear camera 47 in a case where the subject vehicle 1A performs backward travel.

The selection unit 127 selects a captured image used for detection of an obstacle based on the travel route in a case where a turning action is included in the travel route generated by the route generation unit 125. The turning action is an action to change the direction of the subject vehicle 1A for changing a travel direction.

Figure 2:
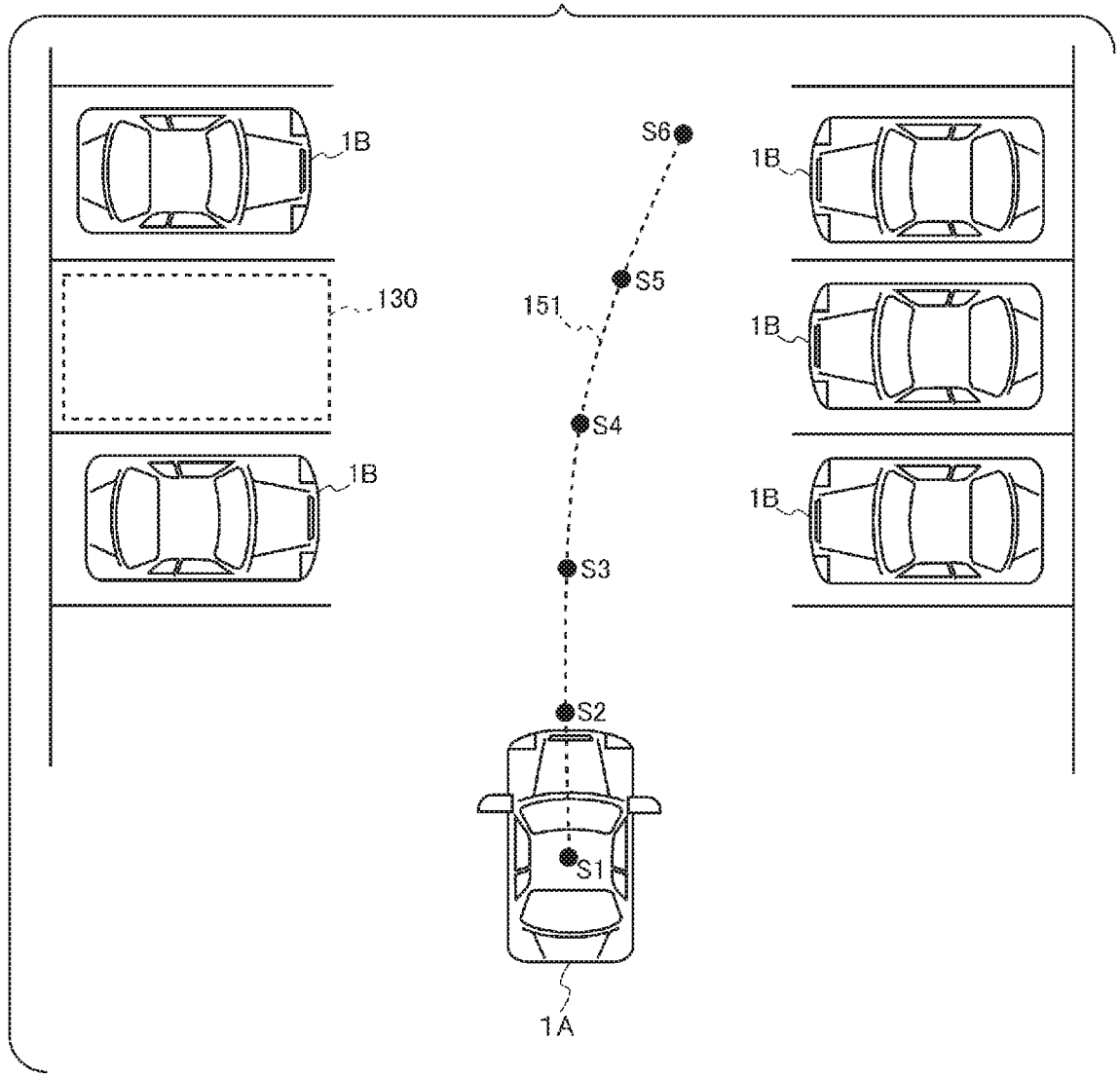
FIG. 2 is a diagram that illustrates one example of a travel route.

FIG. 2 is a diagram that illustrates the travel route for parking the subject vehicle 1A at the parking region. In FIG. 2, a reference character "1B" is provided to vehicles other than the subject vehicle 1A for distinguishing those from the subject vehicle 1A.

It is assumed that the subject vehicle 1A stops at position S1 indicated in FIG. 2 and route generation by the route generation unit 125 is started. A travel route generated by the route generation unit 125 is indicated as a travel route 151 in FIG. 2. The selection unit 127 sets reference points at preset intervals on the travel route 151 generated by the route generation unit 125. FIG. 2 illustrates a case where six reference points of S1, S2, S3, S4, S5, and S6 are set on the travel route 151. The reference point is a point that indicates a position on the travel route 151, in which an attitude angle of the subject vehicle 1A is calculated. The selection unit 127 obtains the attitude angle of the subject vehicle 1A in each of the reference points by computation and determines whether or not a turning action is included in travel on the travel route 151 based on the obtained attitude angle.

The selection unit 127 sets the reference points on the travel route 151 and then calculates the attitude angle in each of the set reference points. The selection unit 127 calculates the attitude angle in each of the other reference points based on the attitude angle in reference point S1 as a start position of the travel route 151. Reference point S1 is the present position of the subject vehicle 1A, and the attitude angle in reference point S1 is calculated by the attitude angle sensor 30. The selection unit 127 calculates the attitude angle in each of reference points S2, S3, S4, S5, and S6 based on the position coordinates of each of reference points S1, S2, S3, S4, S5, and S6 and the attitude angle in reference point S1. Reference point S6 is a stop position at which the subject vehicle 1A stops travel in a case where the subject vehicle 1A is caused to travel along the travel route 151.

Next, the selection unit 127 calculates the difference in the attitude angle between neighboring reference points. First, the selection unit 127 calculates the difference between the attitude angle in reference point S1 as the start position and the attitude angle in reference point S2. The selection unit 127 compares the calculated difference in the attitude angle with a preset threshold value. Here, the difference in attitude angle between reference point S1 and reference point S2, which is generated by the selection unit 127, is denoted as (α1), and the threshold value is denoted as "K". The difference (α1) in attitude angle corresponds to "a change amount in attitude angle" in reference point S2. The selection unit 127 determines that a turning action is included in the travel on the travel route 151 in a case where the calculated difference ($\alpha$1) in attitude angle is greater than the threshold value "K". The selection unit 127 determines that a turning action is included in the travel on the travel route 151 in a case where the difference ($\alpha$1) in attitude angle is greater than the threshold value "K" and then does not calculate the difference in attitude angle in each of the other reference points S3, S4, S5, and S6.

The selection unit 127 calculates the difference in attitude angle between reference point S2 and reference point S3 in a case where the difference ($\alpha$1) in attitude angle is the threshold value or smaller. Here, the difference in attitude angle between reference point S2 and reference point S3, which is generated by the selection unit 127, is denoted as ($\alpha$2). The selection unit 127 adds the calculated difference ($\alpha$2) in attitude angle to the difference ($\alpha$1) in attitude angle and calculates an addition value ($\alpha$1+$\alpha$2). The addition value ($\alpha$1+$\alpha$2) corresponds to "the change amount in attitude angle" in reference point S3.

Figure 3:
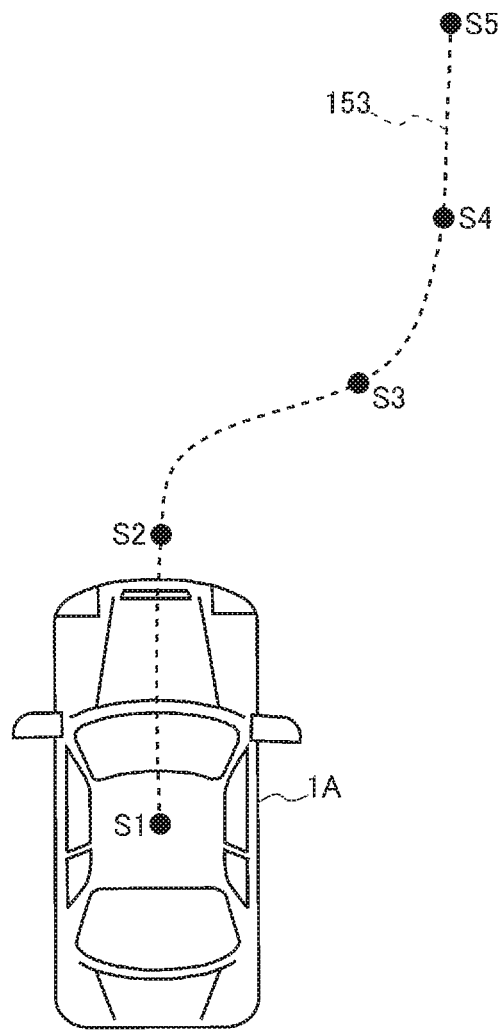
FIG. 3 is a diagram that illustrates one example of the travel route.

FIG. 3 is a diagram that illustrates an example of another travel route 153 generated by the route generation unit 125.

For example, in a case where the subject vehicle 1A is caused to travel along the travel route 153 illustrated in FIG. 3, the subject vehicle 1A is caused to make a right turn at reference point S2 and thereafter make a left turn at reference point S3. Thus, the value of the difference in attitude angle between reference point S2 and reference point S3 and the value of the difference in attitude angle between reference point S3 and reference point S4 are provided as values with the opposite signs, positive and negative, to one another. Thus, when the difference in attitude angle between reference point S3 and reference point S4 is added to the addition value of the difference in attitude angle between reference point S1 and reference point S2 and the difference in attitude angle between reference point S2 and S3, the addition value decreases.

Returning to FIG. 2, a description will further be made about a determination of whether or not a turning action is included in the travel on the travel route 151.

The selection unit 127 compares the calculated addition value ($\alpha$1+$\alpha$2) of the differences in the attitude angle with the threshold value "K". The selection unit 127 determines that a turning action is included in the travel on the travel route 153 in a case where the addition value ($\alpha$1+$\alpha$2) of the differences in attitude angle is greater than the threshold value "K" and then does not calculate the difference in attitude angle in each of the other reference points S4, S5, and S6.

In a case where the addition value ($\alpha$1+$\alpha$2) of the differences in attitude angle is the threshold value "K" or smaller, the selection unit 127 performs similar processing to the processing performed for reference points S1, S2, and S3 for each of reference points S4, S5, and S6. In other words, the selection unit 127 obtains, for reference points S4, S5, and S6, the differences ($\alpha$3, $\alpha$4, $\alpha$5) in attitude angle from respectively first previous reference points S3, S4, and S5 and respectively adds the obtained differences ($\alpha$3, $\alpha$4, $\alpha$5) in attitude angle to the addition values ($\alpha$1+$\alpha$2), ($\alpha$1+$\alpha$2+$\alpha$3), and ($\alpha$1+$\alpha$2+$\alpha$3+$\alpha$4), which are already calculated. The addition values ($\alpha$1+$\alpha$2+$\alpha$3), ($\alpha$1+$\alpha$2+$\alpha$3+$\alpha$4), and ($\alpha$1+$\alpha$2+$\alpha$3+$\alpha$4+$\alpha$5) respectively correspond to "the change amounts in attitude angle" in reference points S4, S5, and S6.

Then, the selection unit 127 compares each of the obtained addition values ($\alpha$1+$\alpha$2+$\alpha$3), ($\alpha$1+$\alpha$2+$\alpha$3+$\alpha$4), and ($\alpha$1+$\alpha$2+$\alpha$3+$\alpha$4+$\alpha$5) of the differences in attitude angle with the threshold value "K". The selection unit 127 determines that a turning action is included in the travel on the travel route 151 in a case where any of the addition values ($\alpha$1+$\alpha$2+$\alpha$3), ($\alpha$1+$\alpha$2+$\alpha$3+$\alpha$4), and ($\alpha$1+$\alpha$2+$\alpha$3+$\alpha$4+$\alpha$5) is greater than the threshold value "K". The selection unit 127 determines that a turning action is not included in the travel on the travel route 151 in a case where ($\alpha$1+$\alpha$2+$\alpha$3+$\alpha$4+$\alpha$5) is the threshold value "K" or smaller.

Figure 4:
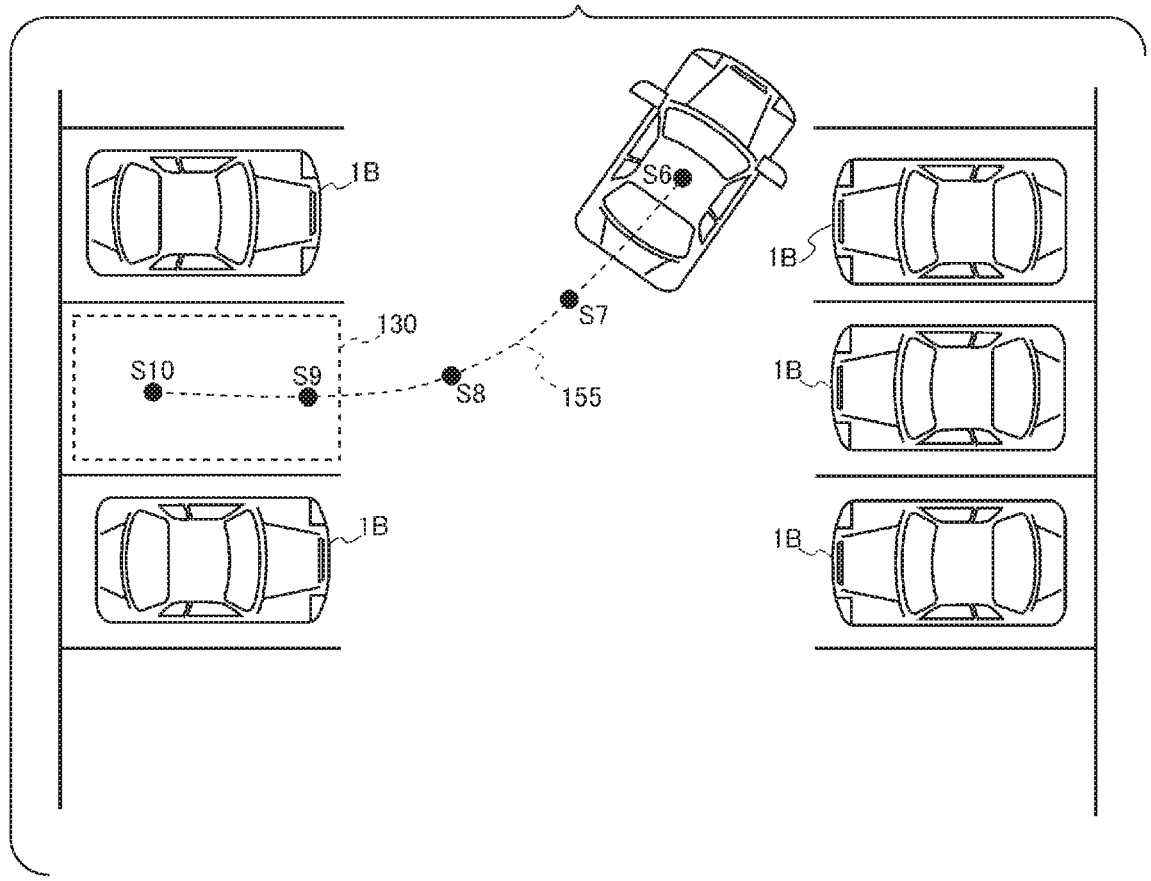
FIG. 4 is a diagram that illustrates one example of the travel route.

FIG. 4 is a diagram that illustrate a travel route for parking the subject vehicle 1A at a parking region 130.

FIG. 4 illustrates a state where control by the vehicle control unit 200 causes the subject vehicle 1A to travel along the travel route 151 and causes the subject vehicle 1A to move to position S6. When the subject vehicle 1A travels to position S6, the parking assistance ECU 100 again generates a travel route by the route generation unit 125. It is assumed that a travel route 155 illustrated in FIG. 4 is generated by the route generation unit 125.

When the travel route 155 is generated, the selection unit 127 sets reference points at preset intervals on the travel route 155 similarly to a case of the travel route 151. Here, it is assumed that as illustrated in FIG. 4, five reference points of S6, S7, S8, S9, and S10 are set.

Similarly to the case of the travel route 151, the selection unit 127 obtains the differences in attitude angle between neighboring reference points and obtains the addition values by adding the obtained differences in attitude angle. The selection unit 127 compares the obtained addition values with the threshold value "K" and determines that a turning action is included in the travel on the travel route 155 in a case where the addition value of the difference in attitude angle becomes greater than the threshold value "K".

Figure 5:
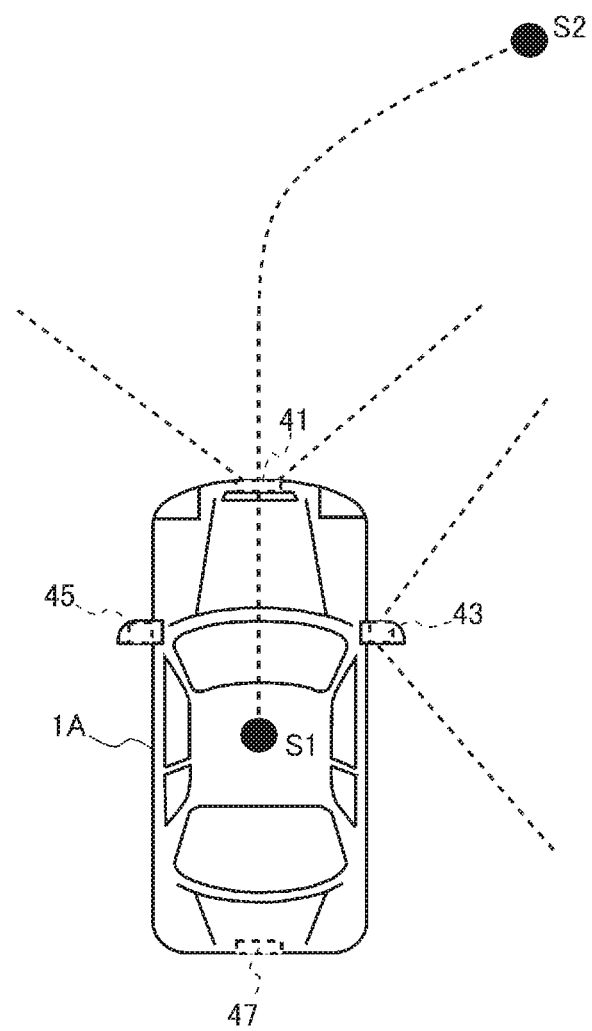
FIG. 5 is a diagram that illustrates an image-capturing range in a case of forward movement and a right turn.
Figure 6:
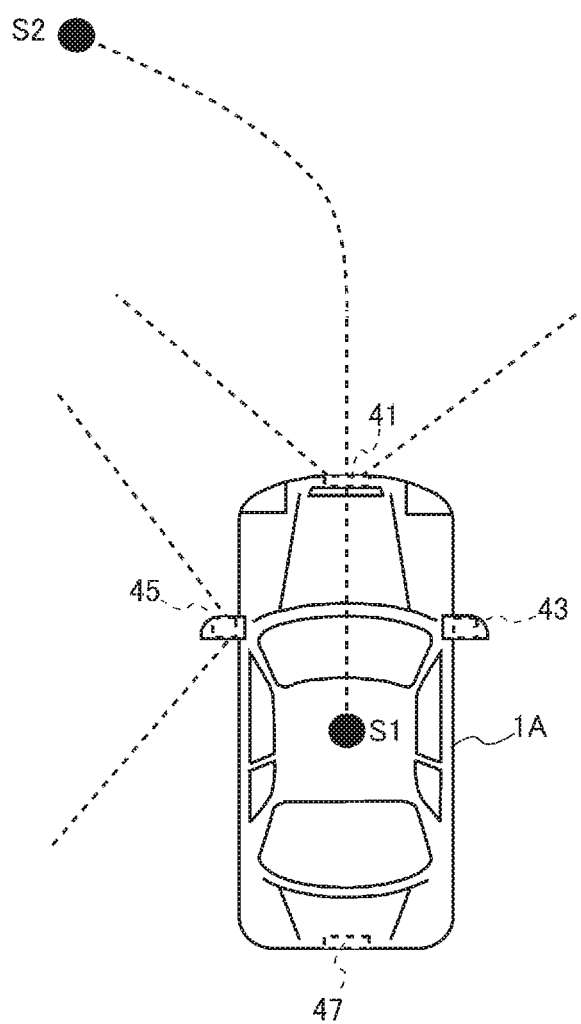
FIG. 6 is a diagram that illustrates the image-capturing range in a case of forward movement and a left turn.
Figure 7:
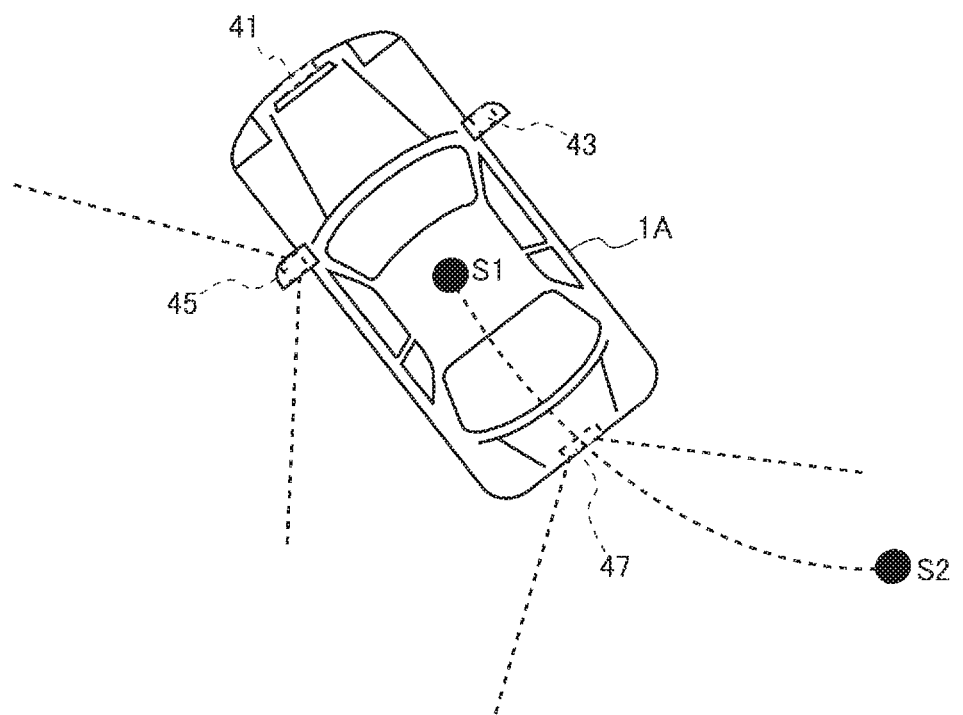
FIG. 7 is a diagram that illustrates the image-capturing range in a case of backward movement and a right turn.
Figure 8:
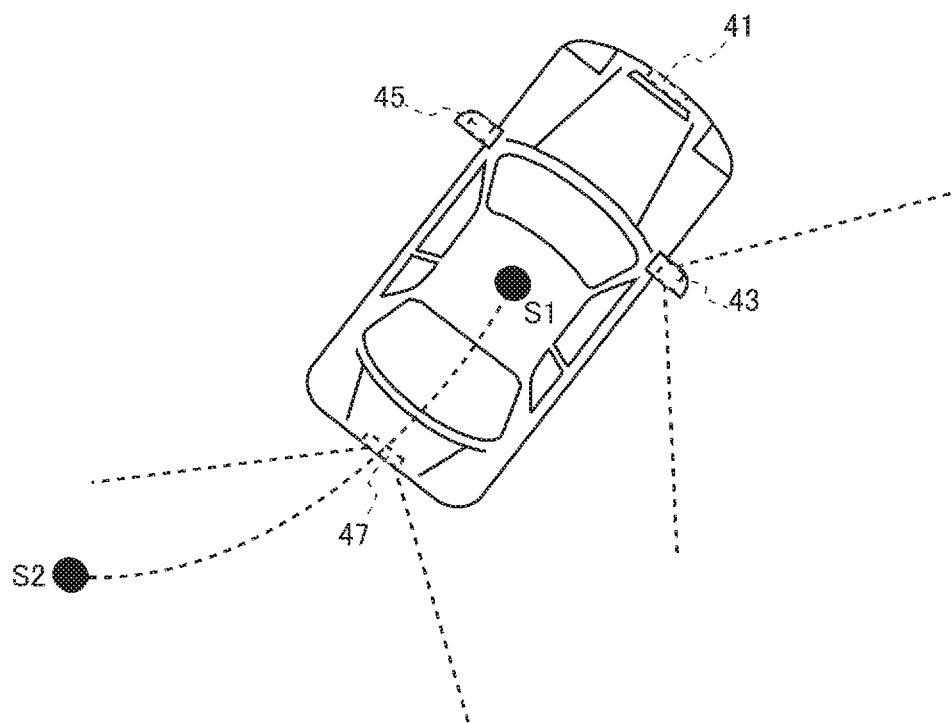
FIG. 8 is a diagram that illustrates the image-capturing range in a case of backward movement and a left turn.

FIG. 5 is a diagram that illustrates an image-capturing range in a case where the subject vehicle 1A performs forward movement and a right turn. FIG. 6 is a diagram that illustrates the image-capturing range in a case where the subject vehicle 1A performs forward movement and a left turn. FIG. 7 is a diagram that illustrates the image-capturing range in a case where the subject vehicle 1A performs backward movement and a right turn. FIG. 8 is a diagram that illustrates the image-capturing range in a case where the subject vehicle 1A performs backward movement and a left turn.

In a case where the selection unit 127 determines that a turning action is included in a case where the subject vehicle 1A is caused to travel on the travel route 151 or the travel route 155, the selection unit 127 selects a captured image used for a determination of whether or not an obstacle that contacts or collides with the subject vehicle 1A due to the turning action is present.

As illustrated in FIG. 5, the selection unit 127 determines that the turning action is a "right turn" in a case where the travel along the travel route generated by the route generation unit 125 is forward travel and reference point S2 positioned in a front area is positioned on a right side of the subject vehicle 1A. In this case, the selection unit 127 selects captured images by the front camera 41 and the right side camera 43 as the captured images used for detection of an obstacle. The right side of the subject vehicle 1A is the right side in a case where a riding person seated in the subject vehicle 1A is directed to the front area of the subject vehicle 1A.

As illustrated in FIG. 6, the selection unit 127 determines that the turning action is a "left turn" in a case where the travel along the travel route generated by the route generation unit 125 is forward travel and reference point S2 positioned in the front area is positioned on a left side of the subject vehicle 1A. In this case, the selection unit 127 selects captured images by the front camera 41 and the left side camera 45 as the captured images used for detection of an obstacle. The left side of the subject vehicle 1A is the left side in a case where a riding person seated in the subject vehicle 1A is directed to the front area of the subject vehicle 1A.

As illustrated in FIG. 7, the selection unit 127 determines that the turning action is a "right turn" in a case where the travel along the travel route generated by the route generation unit 125 is backward travel and reference point S2 positioned in a rear area of the subject vehicle 1A is positioned on the right side of the subject vehicle 1A. In this case, the selection unit 127 selects captured images by the rear camera 47 and the left side camera 45 as the captured images used for detection of an obstacle.

As illustrated in FIG. 8, the selection unit 127 determines that the turning action is a "left turn" in a case where the travel along the travel route generated by the route generation unit 125 is backward travel and reference point S2 positioned in the rear area of the subject vehicle 1A is positioned on the left side of the subject vehicle 1A. In this case, the selection unit 127 selects captured images by the rear camera 47 and the right side camera 43 as the captured images used for detection of an obstacle.

The obstacle detection unit 129 detects an obstacle based on captured images by the image-capturing unit 40 and detection results by the sonars 20.

The obstacle detection unit 129 analyzes captured images selected by the selection unit 127 and detects an obstacle that possibly contacts or collides with the subject vehicle 1A. In a case where the subject vehicle 1A is in a stop position such as reference point S1 or S6 indicated in FIG. 2 and captured images by the front camera 41 or the rear camera 47 and the right side camera 43 are selected by the selection unit 127, the obstacle detection unit 129 analyzes those captured images and detects an obstacle. That is, in a stop state immediately prior to a start of straight movement and a right turning action by the subject vehicle 1A or in a stop state immediately prior to a start of backward movement and a left turning action by the subject vehicle 1A, the obstacle detection unit 129 analyzes the captured images by the front camera 41 or the rear camera 47 and the right side camera 43 and detects an obstacle.

In a case where the subject vehicle 1A is in a stop state and captured images by the front camera 41 or the rear camera 47 and the left side camera 45 are selected by the selection unit 127, the obstacle detection unit 129 analyzes those captured images and detects an obstacle. That is, in a stop state immediately prior to a start of straight movement and a left turning action by the subject vehicle 1A or in a stop state immediately prior to a start of backward movement and a right turning action by the subject vehicle 1A, the obstacle detection unit 129 analyzes the captured images by the front camera 41 or the rear camera 47 and the left side camera 45 and detects an obstacle.

The obstacle detection unit 129 detects an obstacle based on sensing results by the sonars 20. The obstacle detection unit 129 causes the sonars 20 to output ultrasonic waves and detects an obstacle based on reception results of the ultrasonic waves reflected by the obstacle. The obstacle detection unit 129 measures a time from output of the ultrasonic waves by the sonars 20 to reception of the reflected waves of the ultrasonic waves and detects the distance to the obstacle based on the measured time. In a case where an obstacle is detected, the obstacle detection unit 129 outputs the direction in which the detected obstacle is present and distance information that indicates the distance from the subject vehicle 1A to the obstacle to the vehicle control unit 200.

Next, a description will be made about an action flow of the parking assistance ECU 100 of this embodiment with reference to the flowcharts illustrated in FIG. 9 and FIG. 10.

The action flow is started in a case where the navigation device 10 determines that the subject vehicle 1A enters a parking lot. A description will be made about a case where the subject vehicle 1A is in a state where the subject vehicle 1A is stopped at a start of the action flow.

First, the parking assistance ECU 100 acquires captured images by the image-capturing unit 40 and detection results by the sonars 20 in order to search for a parking route (step S1). The parking assistance ECU 100 acquires captured images by reading out the captured images that are captured by the front camera 41, the right side camera 43, the left side camera 45, and the rear camera 47 at prescribed intervals from the memory 110. The parking assistance ECU 100 causes the sonars 20 to start detection of an obstacle and acquires detection results of an obstacle from the sonars 20.

The parking assistance ECU 100 calculates a travel route based on the captured images and the detection results by the sonars 20 (step S2). The travel route calculated here is a route that is set based on the captured images and the detection results by the sonars 20 and is a route to a vehicle stop position at which the subject vehicle 1A is stopped. "Vehicle stop position" may include a parking region for parking the subject vehicle 1A, for example. In a case where the subject vehicle 1A is caused to change the direction by a turnabout, a position in which a turnabout is performed corresponds to the vehicle stop position. In a case where an obstacle is detected on the parking route and a new travel route is calculated in order to avoid the obstacle, a position which is immediately in front of the obstacle and in which the obstacle may be avoided corresponds to the vehicle stop position.

Next, the parking assistance ECU 100 sets reference points on the calculated travel route (step S3). The reference points are set so as to include the present position of the subject vehicle 1A and the stop position on the travel route. The reference points are set at even intervals on the travel route.

Next, the parking assistance ECU 100 selects the reference points in order of closeness to the present position of the subject vehicle 1A (step S4). The parking assistance ECU 100 calculates the difference in attitude angle between the reference point selected in step S4 and the reference point selected at a previous time (step S5). In a case where the reference point selected at the previous time is not present, the parking assistance ECU 100 selects the reference point that corresponds to the present position of the subject vehicle 1A as the reference point selected at the previous time.

Next, the parking assistance ECU 100 adds the calculated difference in attitude angle (step S6). That is, the parking assistance ECU 100 adds the difference in attitude angle calculated at the present time to the difference in attitude angle that is already calculated by the previous time. Next, the parking assistance ECU 100 determines whether or not the difference added in step S6 is greater than the threshold value "K" (step S7). An action flow in a case where the difference added in step S6 is greater than the threshold value "K" (step S7: YES) will be described with reference to the flowchart illustrated in FIG. 10.

In a case where the difference added in step S6 is the threshold value "K" or smaller (step S7: NO), the parking assistance ECU 100 determines whether or not the reference point selected in step S4 is the reference point that corresponds to the vehicle stop position (step S8). In a case where the reference point selected in step S4 is not the reference point that corresponds to the vehicle stop position (step S8: NO), the parking assistance ECU 100 returns to a process of step S4 and repeats processes of steps S5 to S8.

In a case where the reference point selected in step S4 is the reference point that corresponds to the vehicle stop position (step S8: YES), the parking assistance ECU 100 determines that a turning action is not included in the travel route generated in step S2. In this case, the parking assistance ECU 100 selects a captured image by the front camera 41 or the rear camera 47 as a captured image targeted for detection of an obstacle (step S9). The parking assistance ECU 100 selects a captured image by the front camera 41 as a targeted captured image in a case where the advancing direction of the subject vehicle 1A, which is determined based on information of the travel route calculated in step S2 or information such as a shift position of the transmission acquired as the vehicle information, corresponds to forward movement. The parking assistance ECU 100 selects a captured image by the rear camera 47 as a targeted captured image in a case where the advancing direction of the subject vehicle 1A, which is determined based on information of the travel route or information such as the shift position, corresponds to backward movement.

Next, the parking assistance ECU 100 outputs the information of the travel route calculated in step S2 to the vehicle control unit 200. The vehicle control unit 200 generates the control information that controls travel of the subject vehicle 1A based on the travel route calculated by the parking assistance ECU 100. The vehicle control unit 200 controls the engine, the steering, the transmission, and so forth based on the generated control information and starts travel of the subject vehicle 1A (step S10).

When the travel of the subject vehicle 1A is started, the parking assistance ECU 100 analyzes the selected captured image, which is captured by the front camera 41 or the rear camera 47, (step S11) and determines whether or not there is a possibility that the subject vehicle 1A contacts with an obstacle (step S12). In a case where there is not a possibility that the subject vehicle 1A contacts with an obstacle (step S12: NO), the parking assistance ECU 100 determines whether or not the subject vehicle 1A stops at the vehicle stop position (step S14). The parking assistance ECU 100 determines whether or not the subject vehicle 1A stops at the vehicle stop position based on the vehicle information such as the vehicle velocity input from the vehicle control unit 200, for example.

In a case where the subject vehicle 1A does not stop at the vehicle stop position (step S14: NO), the parking assistance ECU 100 returns to step S11 and starts analyzing the next captured image in order of image-capturing (step S11). In a case where the subject vehicle 1A stops at the vehicle stop position (step S14: YES), the parking assistance ECU 100 determines whether or not the vehicle stop position is the parking region (step S15). In a case where the vehicle stop position is not the parking region (step S15: NO), the parking assistance ECU 100 returns to step S1, acquires detection results by the sonars 20 and captured images by the image-capturing unit 40, and calculates the travel route to the next vehicle stop position. In a case where the vehicle stop position is the parking region (step S15: YES), the parking assistance ECU 100 finishes this processing flow.

In a case where the parking assistance ECU 100 determines that there is a possibility that the subject vehicle 1A contacts with an obstacle (step S12: YES) in the determination in step S12, the parking assistance ECU 100 stops travel of the subject vehicle 1A and outputs an alarm sound from the alarm 50 (step S13). Subsequently, the parking assistance ECU 100 returns to step S1, acquires captured images by the image-capturing unit 40 and detection results by the sonars 20 (step S1) and calculates a new travel route in a case where the parking assistance ECU 100 determines that there is not a possibility of collision with an obstacle and the subject vehicle 1A may travel safely based on the acquired captured images and the acquired detection results by the sonars 20 (step S2).

Next, an action of the parking assistance ECU 100 in a case where the difference in attitude angle is greater than the threshold value "K" in step S7 will be described with reference to the flowchart illustrated in FIG. 10.

In a case where the difference in attitude angle is greater than the threshold value "K" (step S7: YES), the parking assistance ECU 100 determines whether or not the reference point set on the travel route is set in the front area of the subject vehicle 1A (step S16). In a case where the reference point is set in the front area of the subject vehicle 1A (step S16: YES), the parking assistance ECU 100 determines that the advancing direction of the subject vehicle 1A is "forward direction" (step S17). In a case where the reference point is set in the rear area of the subject vehicle 1A (step S16: NO), the parking assistance ECU 100 determines that the advancing direction of the subject vehicle 1A is "backward direction" (step S18).

In a case where the parking assistance ECU 100 determines that the advancing direction of the subject vehicle 1A is "forward direction", the parking assistance ECU 100 determines whether or not the reference point is set in a left front area of the subject vehicle 1A (step S19). In a case where the reference point is set in the left front area of the subject vehicle 1A (step S19: YES), the parking assistance ECU 100 determines that a turning direction of the subject vehicle 1A is "left direction" (step S20). In a case where the parking assistance ECU 100 determines that the advancing direction of the subject vehicle 1A is "forward direction" and the turning direction is "left direction", the parking assistance ECU 100 selects captured images by the front camera 41 and the left side camera 45 as images targeted for detection of an obstacle (step S21).

In a case where the reference point is not set in the left front area of the subject vehicle 1A (step S19: NO), the parking assistance ECU 100 determines that the turning direction of the subject vehicle 1A is "right direction" (step S22). In a case where the parking assistance ECU 100 determines that the advancing direction of the subject vehicle 1A is "forward direction" and the turning direction is "right direction", the parking assistance ECU 100 selects captured images by the front camera 41 and the right side camera 43 as images targeted for detection of an obstacle (step S23).

In a case where the parking assistance ECU 100 determines that the advancing direction of the subject vehicle 1A is "backward direction" in step S18, the parking assistance ECU 100 determines whether or not the reference point is set in a left rear area of the subject vehicle 1A (step S24). Here, "left rear area" means a left rear area as seen from the driver seated on the driver seat and corresponds to a case where, as illustrated in FIG. 8, reference point S2 is positioned on the left side of the subject vehicle 1A. In a case where the reference point is set in the left rear area of the subject vehicle 1A (step S24: YES), the parking assistance ECU 100 determines that the turning direction of the subject vehicle 1A is "left direction" (step S25). In a case where the parking assistance ECU 100 determines that the advancing direction of the subject vehicle 1A is "backward direction" and the turning direction is "left direction", the parking assistance ECU 100 selects captured images by the rear camera 47 and the right side camera 43 as images targeted for detection of an obstacle (step S26).

In a case where the reference point is not set in the left rear area of the subject vehicle 1A (step S24: NO), the parking assistance ECU 100 determines that the turning direction of the subject vehicle 1A is "right direction" (step S27). In a case where, as illustrated in FIG. 7, reference point S2 is set on the right side of the subject vehicle 1A, the parking assistance ECU 100 determines that the turning direction of the subject vehicle 1A is "right direction". In a case where the parking assistance ECU 100 determines that the advancing direction of the subject vehicle 1A is "backward direction" and the turning direction is "right direction", the parking assistance ECU 100 selects captured images by the rear camera 47 and the left side camera 45 as images targeted for detection of an obstacle (step S28).

Next, the parking assistance ECU 100 analyzes the captured images selected in any of steps S21, S23, S26, and S28 (step S29) and determines whether or not an obstacle that possibly contacts or collides with the subject vehicle 1A is present (step S30). In a case where there is not a possibility that the subject vehicle 1A contacts with an obstacle (step S30: NO), the parking assistance ECU 100 finishes an analysis of the captured image by the right side camera 43 or the left side camera 45 (step S31) and moves to a process of step S9 in the flowchart illustrated in FIG. 9. Specifically, in a case where the parking assistance ECU 100 determines that the advancing direction of the subject vehicle 1A is "forward direction" in the determination in step S16, the parking assistance ECU 100 selects a captured image by the front camera 41 as an image targeted for detection of an obstacle (step S9). In a case where the parking assistance ECU 100 determines that the advancing direction of the subject vehicle 1A is "backward direction" in the determination in step S16, the parking assistance ECU 100 selects a captured image by the rear camera 47 as an image targeted for detection of an obstacle (step S9).

Subsequently, the parking assistance ECU 100 outputs the information of the travel route calculated in step S2 to the vehicle control unit 200. The vehicle control unit 200 generates the control information that controls travel of the subject vehicle 1A based on the travel route calculated by the parking assistance ECU 100. The vehicle control unit 200 controls the engine, the steering, the transmission, and so forth based on the generated control information and starts travel of the subject vehicle 1A (step S10).

As described above, the parking assistance ECU 100 of this embodiment is a parking assistance device that assists parking of the subject vehicle 1A. The parking assistance ECU 100 includes the route generation unit 125, the selection unit 127, and the obstacle detection unit 129.

The route generation unit 125 generates a travel route on which the subject vehicle 1A travels.

In a case where a turning action for turning the subject vehicle 1A is included in the travel route generated by the route generation unit 125, the selection unit 127 selects, based on the travel route, the camera used for detection of an obstacle among the front camera 41, the right side camera 43, the left side camera 45, and the rear camera 47, which capture images of surroundings of the subject vehicle 1A.

The obstacle detection unit 129 detects an obstacle that possibly contacts with the subject vehicle 1A by analyzing a captured image that is captured by the camera selected by the selection unit 127.

Accordingly, because the camera used for detection of an obstacle is selected based on the travel route in a case where a turning action is included in the travel route, an obstacle that obstructs the turning action may efficiently be detected. Thus, a processing load on an analysis of a captured image may be reduced while safety of a vehicle is maintained.

The selection unit 127 sets the reference points at preset intervals on the travel route, uses the attitude angle of the subject vehicle 1A in the start position of the travel route as a reference, calculates the change amount in attitude angle in each of the reference points, and determines that a turning action is included in the travel route in a case where the reference point is present in which the calculated change amount in attitude angle is greater than the threshold value K.

Accordingly, whether or not a turning action is included in travel on the travel route may precisely be determined.

The obstacle detection unit 129 detects an obstacle that possibly collides with the subject vehicle 1A from a captured image by the camera selected by the selection unit 127, before a start of a turning action, in a case where the subject vehicle 1A is in a stop state.

Accordingly, an obstacle that possibly collides with the subject vehicle 1A due to a turning action may precisely be detected before a start of the turning action. Thus, the subject vehicle 1A is enabled to safely start moving.

The selection unit 127 selects the front camera 41 that captures an image of the front area of the subject vehicle 1A and the left side camera 45 that captures an image of a left area of the subject vehicle 1A in a case where the subject vehicle 1A performs forward travel and where the turning action is a left turn.

Accordingly, in a case where the subject vehicle 1A performs forward travel and a left turn, an obstacle that possibly collides may precisely be detected. Thus, the processing load on the analysis of a captured image may be reduced while safety is maintained in a case where the subject vehicle 1A performs forward travel and a left turn.

The selection unit 127 selects the front camera 41 that captures an image of the front area of the subject vehicle 1A and the right side camera 43 that captures an image of a right area of the subject vehicle 1A in a case where the subject vehicle 1A performs forward travel and where the turning action is a right turn.

Accordingly, in a case where the subject vehicle 1A performs forward travel and a right turn, an obstacle that possibly collides may precisely be detected. Thus, the processing load on the analysis of a captured image may be reduced while safety is maintained in a case where the subject vehicle 1A performs forward travel and a right turn.

The selection unit 127 selects the rear camera 47 that captures an image of the rear area of the subject vehicle 1A and the right side camera 43 that captures an image of the right area of the subject vehicle 1A in a case where the subject vehicle 1A performs backward travel and where the turning action is a left turn.

Accordingly, in a case where the subject vehicle 1A performs backward travel and a left turn, an obstacle that possibly collides may precisely be detected. Thus, the processing load on the analysis of a captured image may be reduced while safety is maintained in a case where the subject vehicle 1A performs backward travel and a left turn.

The selection unit 127 selects the rear camera 47 that captures an image of the rear area of the subject vehicle 1A and the left side camera 45 that captures an image of the left area of the subject vehicle 1A in a case where the subject vehicle 1A performs backward travel and where the turning action is a right turn.

Accordingly, in a case where the subject vehicle 1A performs backward travel and a right turn, an obstacle that possibly collides may precisely be detected. Thus, the processing load on the analysis of a captured image may be reduced while safety is maintained in a case where the subject vehicle 1A performs backward travel and a right turn.

The above-described embodiment merely represents one aspect of the present invention as an example, and any modification and application are possible without departing from the scope of the gist of the present invention.

For example, FIG. 1 is a schematic diagram that illustrates a configuration of the parking assistance ECU 100 by categorizing that in accordance with principal processing contents for easy understanding of the invention of the application, and the configuration of the parking assistance ECU 100 may be categorized into more configuration elements in accordance with processing contents. Categorization may be made such that one configuration element executes more pieces of processing.

In the above-described embodiment, a description is made about a case where the parking assistance device is configured with an ECU that controls travel of a vehicle; however, the parking assistance device may be configured as a portion of functions of a navigation device that has a navigation function.

In a case where a control method of the parking assistance device of the present invention is realized by using a computer, a program to be executed by the computer may be configured in a form of a recording medium or of a transmission medium that transmits the program. As a recording medium, a magnetic or optical recording medium or a semiconductor memory device may be used. Specifically, portable or fixed recording media such as a flexible disk, a hard disk drive (HDD), a compact disk read-only memory (CD-ROM), a DVD, a Blu-ray® disk, a magneto-optical disk, a flash memory, and a card recording medium may be included. The above recording medium may be a non-volatile storage device such as a RAM, a ROM, or an HDD included in the parking assistance ECU 100.

Figure 9:
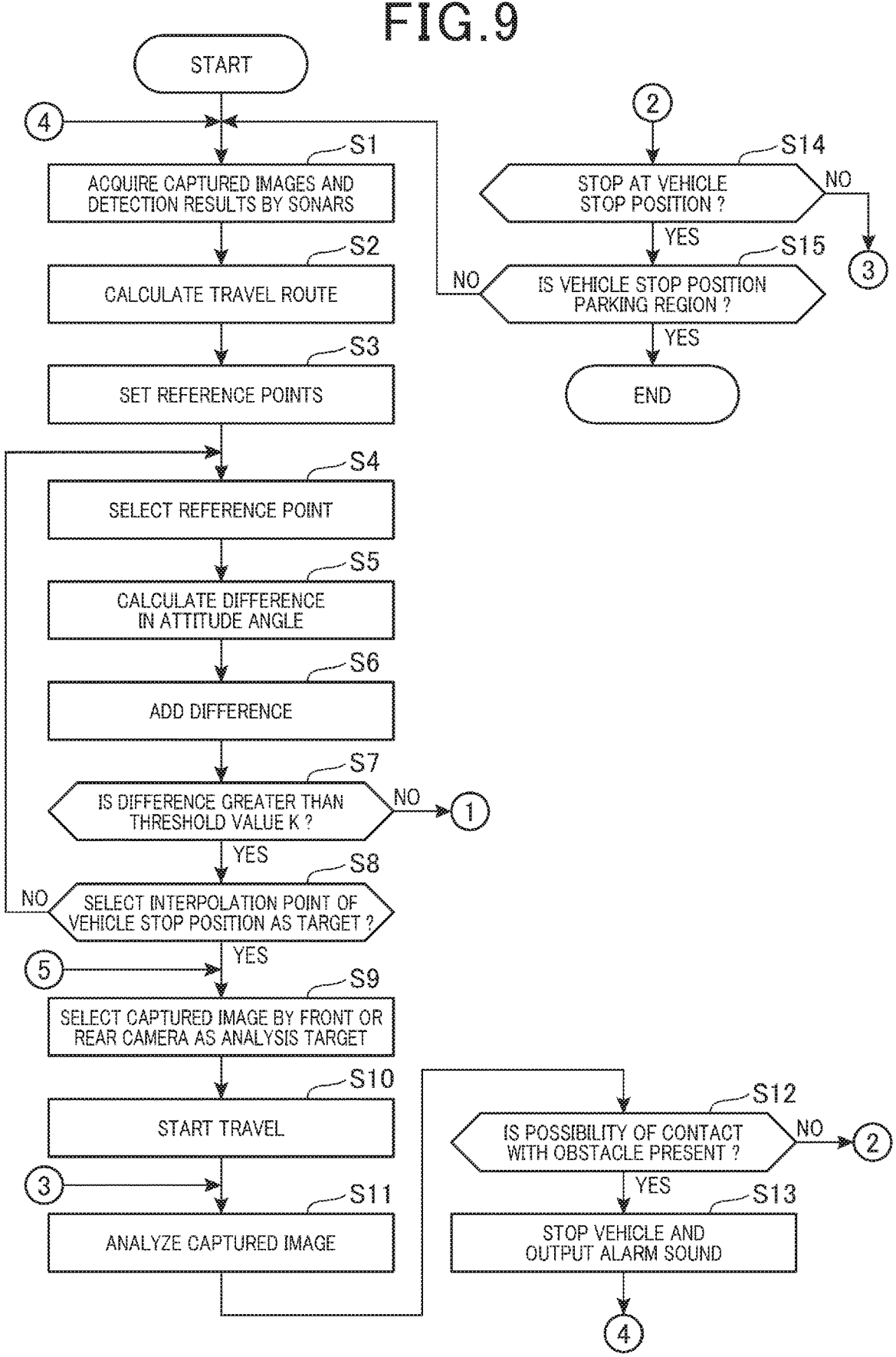
FIG. 9 is a flowchart that illustrates an action of a parking assistance device.
Figure 10:
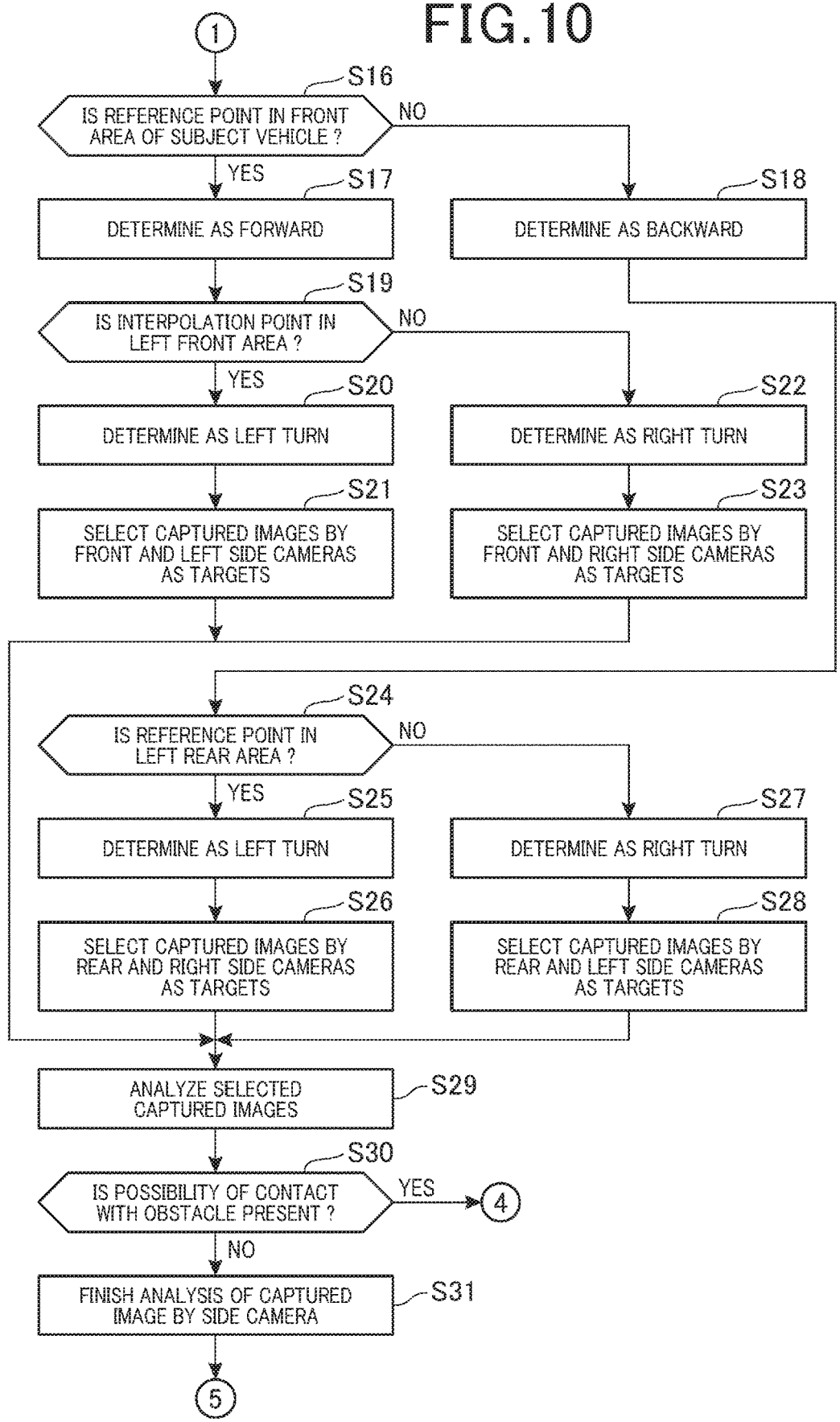
FIG. 10 is a flowchart that illustrates an action of the parking assistance device.

For example, processing units in the flowcharts illustrated in FIG. 9 and FIG. 10 are divided in accordance with principal processing contents for easy understanding of processing by the parking assistance ECU 100, and the present invention is not limited by manners of division or names of processing units. The processing by the parking assistance ECU 100 may be divided into more processing units according to the processing contents. Division may be made such that one processing unit includes more pieces of processing.

REFERENCE SIGNS LIST 1A subject vehicle
10 navigation device
20 sonar
30 attitude angle sensor
40 image-capturing unit
41 front camera
43 right side camera
45 left side camera
47 rear camera
50 alarm
100 parking assistance ECU
110 memory
115 control program
120 processor
121 communication control unit
123 parking region detection unit
125 route generation unit
127 selection unit
129 obstacle detection unit
130 parking region
151, 153, 155 travel route
200 vehicle control unit

What is claimed is:

1. A parking assistance device that assists parking of a vehicle, the parking assistance device comprising: a processor that generates a travel route on which the vehicle travels;

selects, based on an advancing direction of the travel route, a camera used for detection of an obstacle among plural cameras which capture an image of a surrounding of the vehicle, in a case where a turning action of the vehicle is included in the travel route; and detects an obstacle which possibly contacts with the vehicle from a captured image captured by the selected camera, wherein the processor sets a plurality of reference points at preset intervals on the travel route between a present position as a start position of the travel route and a stop position at which the vehicle stops travel, calculates an attitude angle of the present position as the start position of the travel route based on an output of an attitude angle sensor, calculates an attitude angle of the vehicle at each of the reference points based on the attitude angle of the vehicle at the start position of the travel route and a position coordinate of each of the reference points, calculates a change amount which is difference in the attitude angle between neighboring reference points, and determines whether or not the change amount in the attitude angle is greater than a threshold value in each of the neighboring reference points, and determines that a turning action is included in the travel route between the reference points where the calculated change amount in the attitude angle is greater than the threshold value.

2. The parking assistance device according to claim 1, wherein the processor detects an obstacle that possibly collides with the vehicle from a captured image captured by the selected camera, before a start of the turning action, in a case where the vehicle is in a stop state.

3. The parking assistance device according to claim 1, wherein the processor selects a front area camera that captures an image of a front area of the vehicle and a left area camera that captures an image of a left area of the vehicle among the plural cameras in a case where the vehicle performs forward travel and where the turning action is a left turn.

4. The parking assistance device according to claim 1, wherein the processor selects a front area camera that captures an image of a front area of the vehicle and a right area camera that captures an image of a right area of the vehicle among the plurals cameras in a case where the vehicle performs forward travel and where the turning action is a right turn.

5. The parking assistance device according to claim 1, wherein the processor selects a rear area camera that captures an image of a rear area of the vehicle and a right area camera that captures an image of a right area of the vehicle among the plurals cameras in a case where the vehicle performs backward travel and where the turning action is a left turn.

6. The parking assistance device according to claim 1, wherein the processor selects a rear area camera that captures an image of a rear area of the vehicle and a left area camera that captures an image of a left area of the vehicle among the plurals cameras in a case where the vehicle performs backward travel and where the turning action is a right turn.

7. A control method of a parking assistance device that assists parking of a vehicle, the control method comprising:
- a step of generating a travel route on which the vehicle travels;
- a step of selecting a camera used for detection of an obstacle among plural cameras mounted on the vehicle based on an advancing direction of the travel route in a case where a turning action of the vehicle is included in the travel route; and
- a step of detecting an obstacle that possibly contacts with the vehicle from a captured image captured by the selected camera,
- wherein the step of selecting includes the steps of selecting a plurality of reference points at preset intervals on the travel route between a present position as a start position of the travel route and a stop position at which the vehicle stops travel,
- calculating an attitude angle of the present position as the start position of the travel route based on an output of an attitude angle sensor,
- calculating an attitude angle of the vehicle at each of the reference points based on the attitude angle of the vehicle at the start position of the travel route and a position coordinate of each of the reference points,
- calculating a change amount which is difference in the attitude angle between neighboring reference points, and
- determining whether or not the change amount in the attitude angle is greater than a threshold value in each of the neighboring reference points, and determining that a turning action is included in the travel route between the reference points where the calculated change amount in the attitude angle is greater than the threshold value.

* * * * *